United States Patent [19]

Yost

[11] 4,432,513
[45] Feb. 21, 1984

[54] GAS-PROOF FASTENING SYSTEM FOR A NON-RIGID AIRSHIP

[76] Inventor: Paul E. Yost, P.O. Box 165, Tea, S. Dak. 57064

[21] Appl. No.: 185,545

[22] Filed: Sep. 9, 1980

[51] Int. Cl.³ .............................. B64B 1/46; B64B 1/64
[52] U.S. Cl. ......................................... 244/99; 24/443;
2/DIG. 6; 2/2.1 R; 244/31
[58] Field of Search .................... 244/99, 29, 30, 31,
244/96, 97; 24/204; 224/901; 2/DIG. 6, 2.1 R

[56] References Cited

U.S. PATENT DOCUMENTS

| | | | |
|---|---|---|---|
| 1,008,131 | 11/1911 | Gardiner | 244/99 |
| 1,722,375 | 7/1929 | Hipssich | 2/2.1 R |
| 3,337,876 | 8/1967 | Armstrong | 2/2.1 R |
| 3,464,094 | 9/1969 | Mates | 24/204 |
| 3,484,974 | 12/1969 | Calmore | 2/DIG. 6 |
| 4,033,527 | 7/1977 | Parsons | 244/99 |
| 4,042,192 | 8/1977 | Walter | 244/99 |

FOREIGN PATENT DOCUMENTS 127633 6/1919 United Kingdom .................. 244/99

Primary Examiner—Galen L. Barefoot
Attorney, Agent, or Firm—Hill, Van Santen, Steadman & Simpson

[57] ABSTRACT

A gas leak proof sealing panel system is disclosed for a non-rigid airship such as a gas balloon. The sealing panel system is especially useful as a rip panel for rapid deflation of the airship. The rip panel covers an aperture in an envelope of the airship and is held in position by hook-loop releasable fastening type strips. Grease is applied to at least one of the strips such that when they are aligned and mated, a gas leak proof seal is formed.

6 Claims, 4 Drawing Figures

GAS-PROOF FASTENING SYSTEM FOR A NON-RIGID AIRSHIP

BACKGROUND OF THE INVENTION

It is known to provide in non-rigid airships such as gas balloons (helium, coal gas or hydrogen) a so-called "rip" panel which, when opened by pulling on a rip cord, permits rapid deflation of the balloon. Typically such rip panels are positioned in one of the gores of the envelope near a top thereof such that the lifting gas in the envelope can rapidly escape for deflation at landing.

It has been known to provide a rip panel as a pie-shaped pull-out section which is glued in place with a narrow strip of rubber cement around the periphery. After flight termination, the adhesive is reapplied to the pie-shaped rip panel and it is positioned in its proper place on the envelope to allow the adhesive to dry.

It is also known to provide a rip panel system wherein small grommets with apertures therein such as those employed in shoes for lacing are provided around a periphery of the rip panel and corresponding aperture. A small cotton break cord is laced through these holes and tied at each matching pair of grommets, so as to hold the rip panel in place. The lacing and the gap is then covered with an adhesive pressure sensitive tape which is thereafter hand rolled to apply pressure to assure a gas tight bond. Several hours are required for one to lace and seal such a closure to make the balloon ready for flight. Also, extremely cold temperatures can cause the adhesive tape to lose its holding capability and hot temperatures tend to wrinkle the tape and allow horizontal tunnels to form gas leakage passages.

SUMMARY OF THE INVENTION

It is an object of the invention to improve upon the aforementioned prior art gas sealing panel systems in non-rigid airships.

It is a further object of the invention to provide a gas sealing system for a rip panel of a gas balloon which is both convenient to use for deflation at the termination of the flight and also requires minimum time to reseal after use of the rip panel. Also, it is imperative that an effective gas seal be provided to prevent escape of lifting gases. Furthermore, the system should be relatively impervious to extreme temperature variations.

According to the invention, a gas leak proof sealing panel system is provided for a non-rigid airship wherein an aperture is provided in a flexible envelope of the airship. A sealing panel of flexible material is provided which is dimensioned to cover the aperture. A first Velcro strip (hook-loop fastening strip) is provided adjacent a substantial portion of a periphery of the aperture. A second hook-loop strip is provided adjacent a substantial portion of a periphery of the sealing panel and is positioned to releasably mate with the first strip when the sealing panel is aligned in position to cover the aperture. A gas sealing grease is applied to at least one of the first and second strips such that when the strips are mated a gas leak proof seal is formed.

DESCRIPTION OF THE PREFERRED EMBODIMENTS

Figure 1:
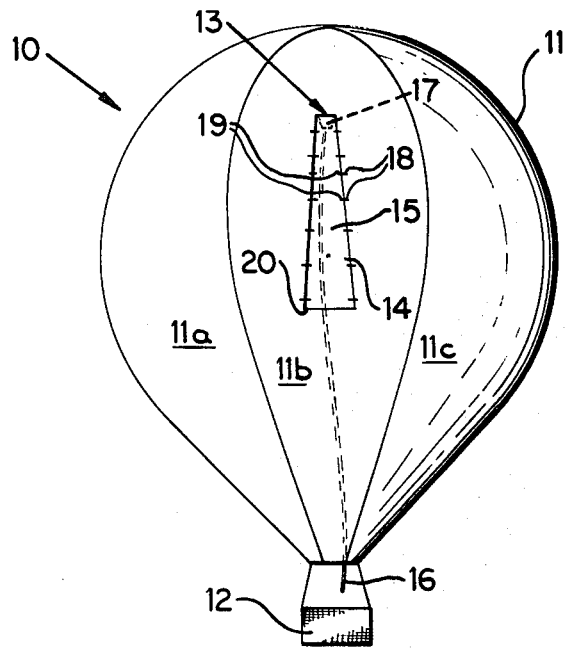
FIG. 1 is a side view of a non-rigid airship employing the gas leak proof releasable sealing panel system of the invention.

A non-rigid airship such as a gas balloon is generally illustrated at 10 in FIG. 1. Typically such balloons are formed of a flexible envelope 11 from which a gondola 12 is suspended.

Typically the envelope 11 is formed of a plurality of gores 11a,b,c. In one of the gores 11b a rip panel system 13 is provided for rapid deflation of the envelope to deflate the envelope after the completion of a flight. Although in a preferred embodiment of this invention, the gas sealing system described herein is employed in conjunction with the rapid deflation rip panel system, the invention is not so limited and may also be employed in other releasable panel systems in non-rigid airships.

In the gore 11b of the envelope 11 an aperture or cut-out 14 is provided near a top of the balloon from which location rapid expulsion is desired. A rip panel 15 is dimensioned to cover the aperture 14. A rip line 16 such as a cord or strap of nylon or other strong material is attached at one end of the rip panel 15 by a pull tab 17. The other end of the rip panel is connected to the envelope at 20 by a seam or connecting point.

After the rip panel has been pulled free of the aperture 14, in preparation for the next flight it is necessary to realign the rip panel over the aperture 14. For this purpose index alignment marks 18 and 19 are provided on the envelope and also on the rip panel 15.

Figure 2:
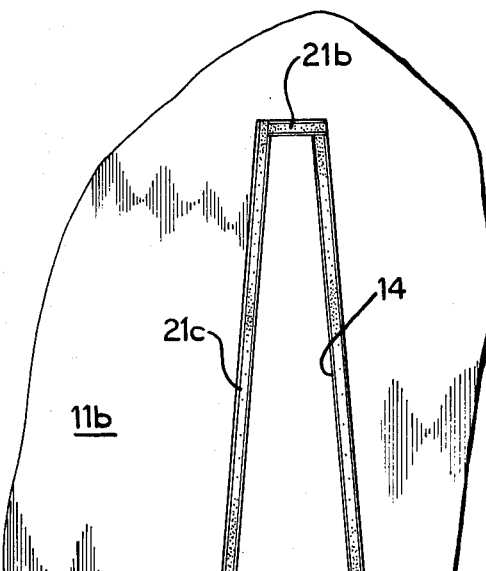
FIG. 2 is an expanded view of the releasable sealing panel system viewed from within the envelope of FIG. 1.
Figure 3:
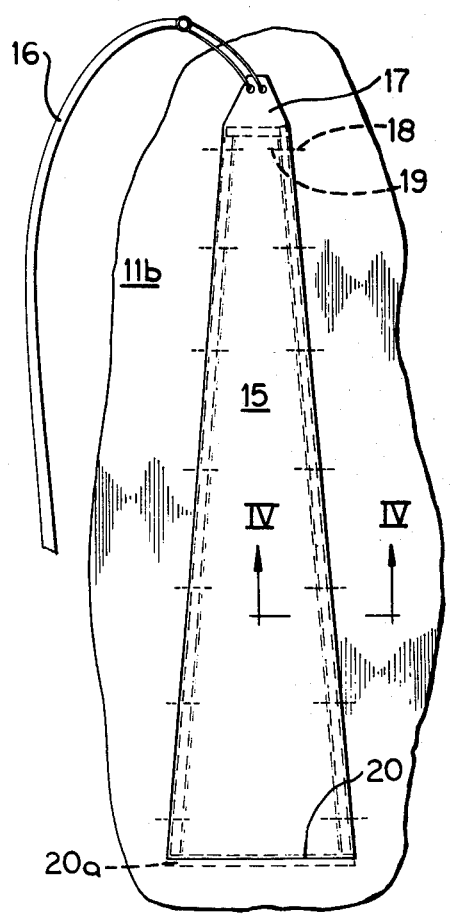
FIG. 3 is similar to FIG. 2 but shows the releasable sealing panel system in a closed position viewed from within the envelope.

As shown in FIGS. 2 and 3, the rip panel connects at 20 such as by an overlap of material at 20a.

Around a periphery of the aperture 14 Velcro strips 21a,b,c (Velcro is a registered trademark of Velcro, Inc.) are positioned. For mating with these first strips, second Velcro strips 22a,b,c are provided around a periphery of the rip panel 15. Since the bottom end of the rip panel 15 is securely attached to the envelope, it is not required that Velcro strips be applied at this edge.

For purposes of this invention, Velcro strips are intended to encompass releasable fastening strips of the hook-pile type or hook-loop type, or other similar releasable fastening strips which do not employ glue-like adhesives.

The Velcro strips may be mounted on a base cloth 23 or 24 which surround the rip panel and aperture.

Figure 4:
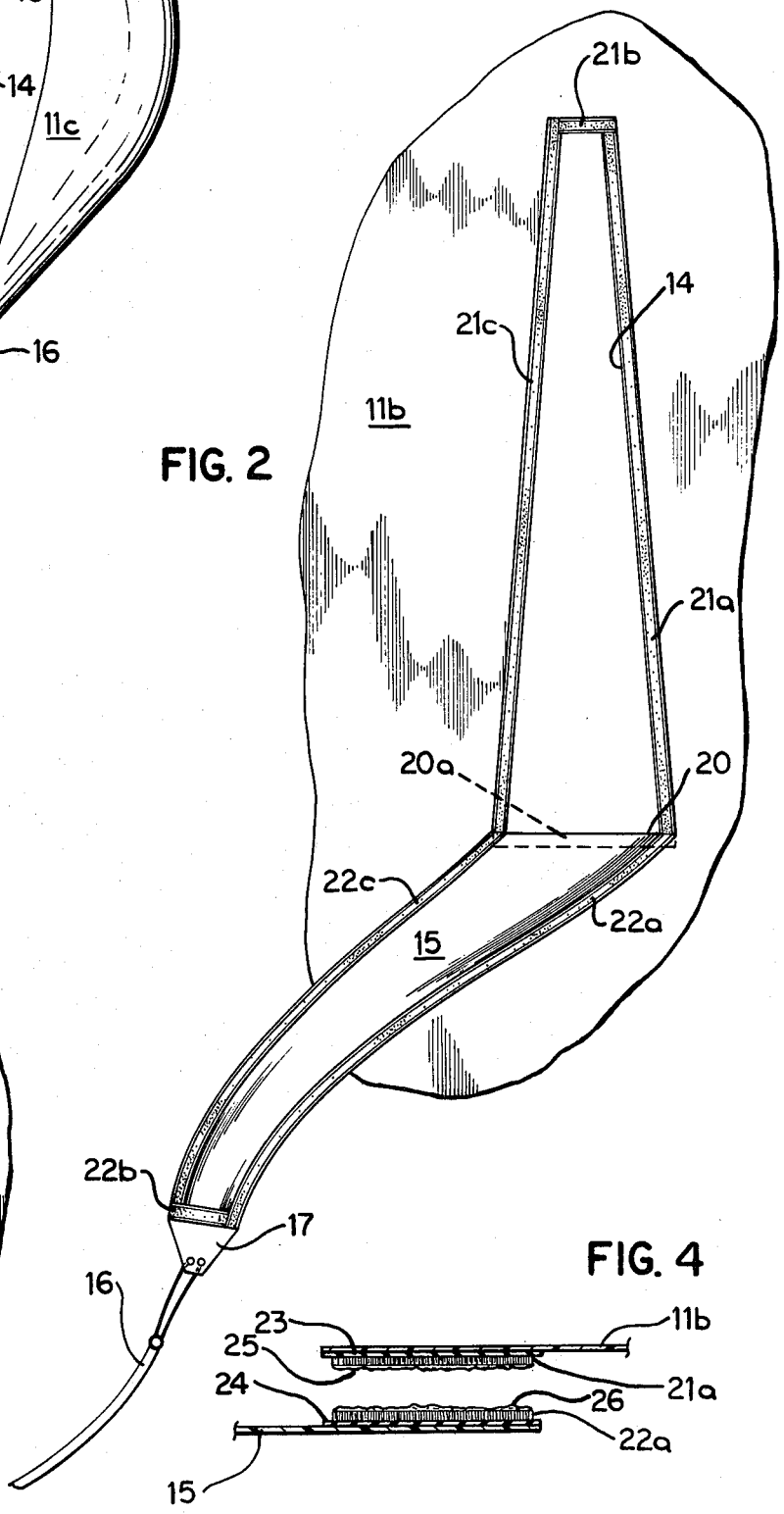
FIG. 4 is a fragmentary cross-sectional view taken along IV—IV of FIG. 3.

In order to provide the gas-sealing characteristics of the invention, a layer of grease 25 is applied to one of the strips such as shown in FIG. 4. If desirable, an additional layer of grease 26 may also be provided on the other Velcro strip.

The grease utilized to impregnate the Velcro is a heavy viscosity silicone grease (Dow Corning No. 111 compound) which maintains its consistency from $-40°$ F. to $500°$ F. The grease forms a gas barrier to prevent the lifting gas from escaping during flight.

In accordance with a method of the invention, to close the rip panel, silicone grease is applied to the Velcro. It is not necessary to apply additional grease each time the panel is used. The rip panel is aligned over the aperture with the grease-treated Velcro surfaces facing one another. The index marks are matched and the Velcro strips joined. Paper towels may then be used to remove excess grease and a roller may be employed to apply pressure for complete sealing of the closure.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A gas leak proof releasable sealing panel system for a non-rigid gas leak-proof airship formed of a flexible gas leak-proof envelope, comprising:
 an aperture in the envelope;
 a sealing panel of flexible material dimensioned to cover the aperture;
 a first hook-pile fastening strip adjacent a substantial portion of a periphery of the aperture;
 a second hook-pile fastening strip adjacent a substantial portion of a periphery of the sealing panel and positioned to releasably mate with the first strip when the sealing panel is aligned in position to cover the aperture; and
 a gas sealing heavy viscosity silicon grease applied to at least one of the first and second strips such that when the strips are mated a gas leak proof seal is formed for at least one of the gases selected from the group consisting of helium, coal gas and hydrogen.

2. The sealing panel system of claim 1 wherein the sealing panel comprises a rip panel with a rip line attached thereto, the rip panel and aperture being dimensioned to allow rapid deflation of the envelope when the rip line is pulled.

3. The sealing panel system of claim 1 wherein one end of the sealing panel is fixedly attached to the envelope and the first and second strips run along the remaining entire periphery of the panel and aperture.

4. The sealing panel of claim 2 wherein the rip line attaches to the rip panel by a hinged pull tab.

5. The panel of claim 1 wherein the first and second strips have a base strip for the hook-loop strips.

6. An improved gas balloon rip panel system, comprising:
 a non-rigid gas balloon containing one of the gases selected from the group consisting of helium, coal gas and hydrogen, and formed of a flexible envelope;
 an aperture in an upper portion of the envelope;
 a rip panel of flexible material dimensioned to cover the aperture and having one end securely fastened to the envelope at one end of the aperture;
 a rip cord fastened at the other end of the rip panel;
 hook-pile type releasable fastening strips along the periphery of the panel and aperture which are positioned to mate with one another in hook-pile fashion; and
 a heavy-viscosity silicon grease applied to at least one of the strips to gas seal the panel in position over the aperture.

* * * * *